(12) United States Patent
Thielman

(10) Patent No.: US 8,248,454 B2
(45) Date of Patent: Aug. 21, 2012

(54) VIDEO DISPLAY CALIBRATION SYSTEM AND METHOD

(75) Inventor: Jeff Thielman, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1022 days.

(21) Appl. No.: 12/203,699

(22) Filed: Sep. 3, 2008

(65) Prior Publication Data

US 2009/0122132 A1 May 14, 2009

Related U.S. Application Data

(60) Provisional application No. 60/987,849, filed on Nov. 14, 2007.

(51) Int. Cl.
*H04N 7/14* (2006.01)
(52) U.S. Cl. ................... 348/14.08; 348/14.07
(58) Field of Classification Search ...... 348/14.01–14.1, 348/14.11, 14.16, 169, 180, 189; 345/1.1, 345/1.2, 1.3, 2.1
See application file for complete search history.

(56) References Cited

U.S. PATENT DOCUMENTS

| | | | |
|---|---|---|---|
| 4,746,970 A | 5/1988 | Hosokawa | |
| 5,083,195 A | 1/1992 | Evelin | |
| 5,452,019 A | 9/1995 | Fukuda | |
| 5,510,851 A | 4/1996 | Foley | |
| 5,892,585 A | 4/1999 | Lianza | |
| 6,043,909 A | 3/2000 | Holub | |
| 6,101,287 A | 8/2000 | Corum et al. | |
| 6,208,372 B1 * | 3/2001 | Barraclough | 348/14.16 |
| 6,285,349 B1 | 9/2001 | Smith | |
| 6,340,976 B1 | 1/2002 | Oguchi et al. | |
| 6,459,425 B1 | 10/2002 | Holub | |
| 6,611,249 B1 | 8/2003 | Evanicky | |
| 6,750,992 B1 | 6/2004 | Holub | |
| 6,853,387 B2 | 2/2005 | Evanicky | |
| 6,870,563 B1 | 3/2005 | Kang | |
| 6,933,967 B2 | 8/2005 | Doyle | |
| 7,068,263 B2 | 6/2006 | Evanicky | |
| 7,224,386 B2 | 5/2007 | Kang | |
| 2005/0021258 A1 | 1/2005 | Fasciano | |
| 2005/0140779 A1 | 6/2005 | Schulz et al. | |
| 2006/0181552 A1 | 8/2006 | Hopple | |
| 2007/0132790 A1 | 6/2007 | Miller | |
| 2007/0216772 A1 | 9/2007 | Xu et al. | |
| 2008/0246606 A1 | 10/2008 | Smith | |
| 2009/0160878 A1 | 6/2009 | Kwong | |
| 2009/0184947 A1 | 7/2009 | Hupman | |

FOREIGN PATENT DOCUMENTS

| | | |
|---|---|---|
| GB | 2431265 | 4/2007 |
| JP | 06276541 | 9/1994 |
| JP | 2003050572 | 2/2003 |
| KR | 1020010097874 | 11/2001 |

OTHER PUBLICATIONS

U.S. Appl. No. 12/009,753, Non-Final Rejection dated Dec. 1, 2010, pp. 1-9 and attachment.
U.S. Appl. No. 12/009,753, Non-Final Rejection dated May 20, 2011, pp. 1-9 and attachment.

* cited by examiner

*Primary Examiner* — Tuan Nguyen

(57) ABSTRACT

A video display system includes a video display environment having a video display, a display sensor, oriented to view the display, and a display control system. The control system is controllable from outside the video display environment, and is interconnected with the video display and the display sensor. The control system is configured to receive a signal from the display sensor, and to calibrate a display parameter of the display in response to the signal.

15 Claims, 6 Drawing Sheets

VIDEO DISPLAY CALIBRATION SYSTEM AND METHOD

CROSS-REFERENCE TO RELATED APPLICATIONS

This Application claims the benefit of U.S. Provisional patent application Ser. No. 60/987,849, filed Nov. 14, 2007, which is hereby incorporated by reference in it's entirety.

BACKGROUND

The present disclosure relates generally to remote video display systems, such as are used in remote video conference systems. More specifically, the present disclosure relates to a video display calibration system using integrated sensors in a video room.

Video conference systems that use specially-configured video conference studios have been developed to provide the look and feel of a face-to-face conference. Such systems can include a pair (or more) of specially-configured video conference studios that each include seating places for multiple persons facing one or more video conference displays. One or more video conference cameras take images of the persons in each room, and provide the respective images to corresponding video displays in the other video conference studios, wherever they are located. In this type of video conference arrangement, the participants can see and hear the other participants as if they were all together in the same room. These types of video conference systems are sometimes referred to as "remote presence" or "telepresence" video conference systems. With the video conference cameras properly oriented and a suitable background in each conference room, this configuration can provide a blended video conference environment that approximates the appearance of a face-to-face conference session.

One potentially time-consuming and expensive process that can be associated with remote presence video conference systems is the calibration of the video displays in the video conference rooms. Some video conferencing systems do not calibrate their displays. This can be acceptable for a single display system. However, in a multiple display system it can be desirable to calibrate all of the monitors to the same standard in order to provide a high quality video conference experience. For example, where multiple displays are present in a single video conference studio, it is desirable that each display be calibrated to the same color output, so that skin tones, backgrounds, and other elements of the displayed images have consistent coloring and appearance from one display to another. Calibration of the displays in a video conference room typically requires that a qualified technician physically visit the conference room, and use special instrumentation to analyze the display parameters, then calibrate the displays. This approach can be expensive and time consuming.

BRIEF DESCRIPTION OF THE DRAWINGS

Various features and advantages of the present disclosure will be apparent from the detailed description which follows, taken in conjunction with the accompanying drawings, which together illustrate, by way of example, features of the present disclosure, and wherein.

DETAILED DESCRIPTION

Figure 1:
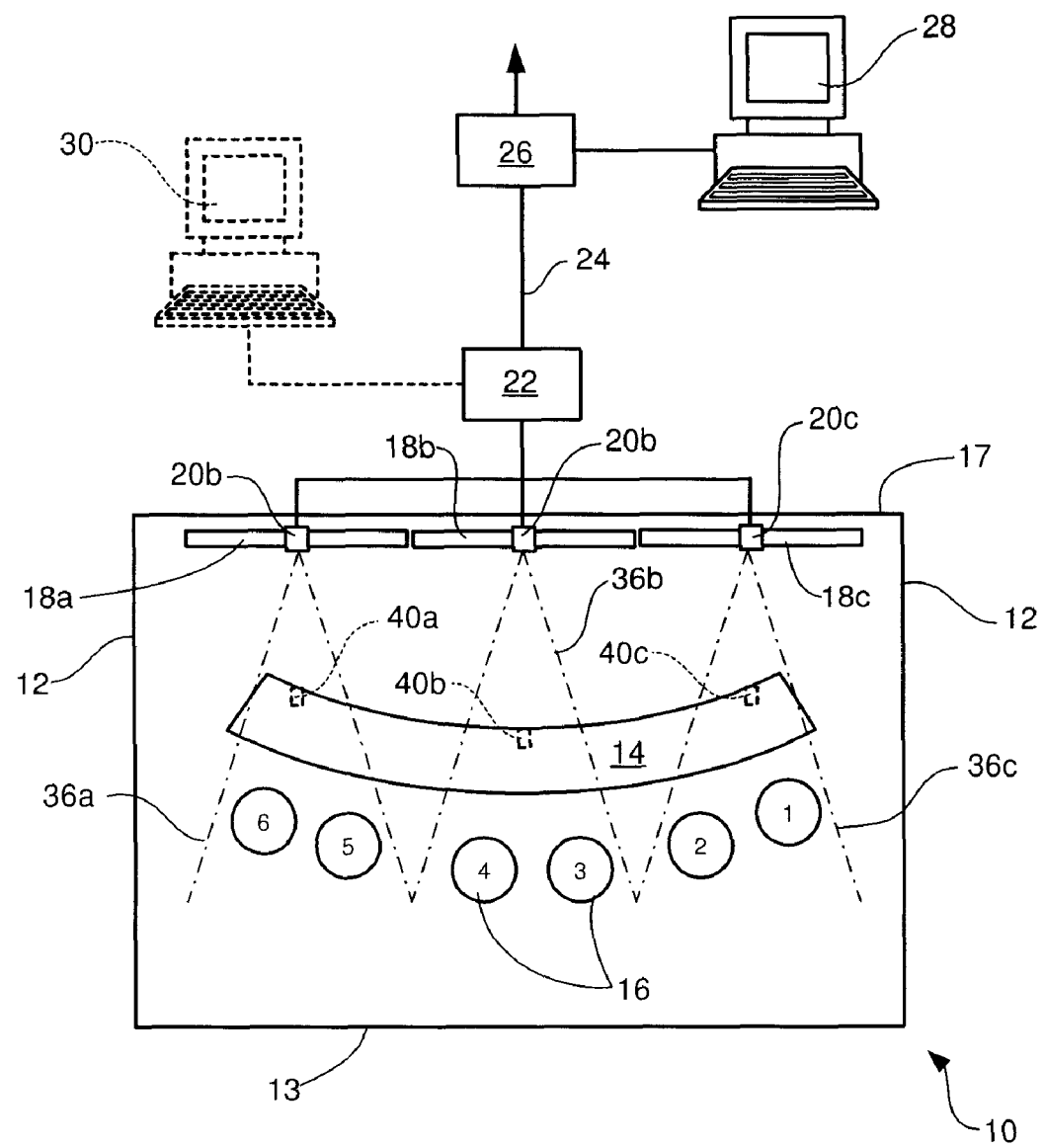
FIG. 1 is a plan view of one embodiment of a video conference room incorporating a display calibration system.

Reference will now be made to exemplary embodiments illustrated in the drawings, and specific language will be used herein to describe the same. It will nevertheless be understood that no limitation of the scope of the present disclosure is thereby intended. Alterations and further modifications of the features illustrated herein, and additional applications of the principles illustrated herein, which would occur to one skilled in the relevant art and having possession of this disclosure, are to be considered within the scope of this disclosure.

This invention relates generally to video display calibration. Specialized video conference environments that are designed to provide the look and feel of an in-person conference, also called "remote presence" video conference studios, have been developed and are becoming more widely used. A plan view of one embodiment of a specially-configured video conference studio 10 is provided in FIG. 1. A perspective view looking toward the displays at the front of an embodiment of such a room is provided in FIG. 2, and an elevation/cross-sectional view of another embodiment of such a room is shown in FIG. 3.

Figure 2:
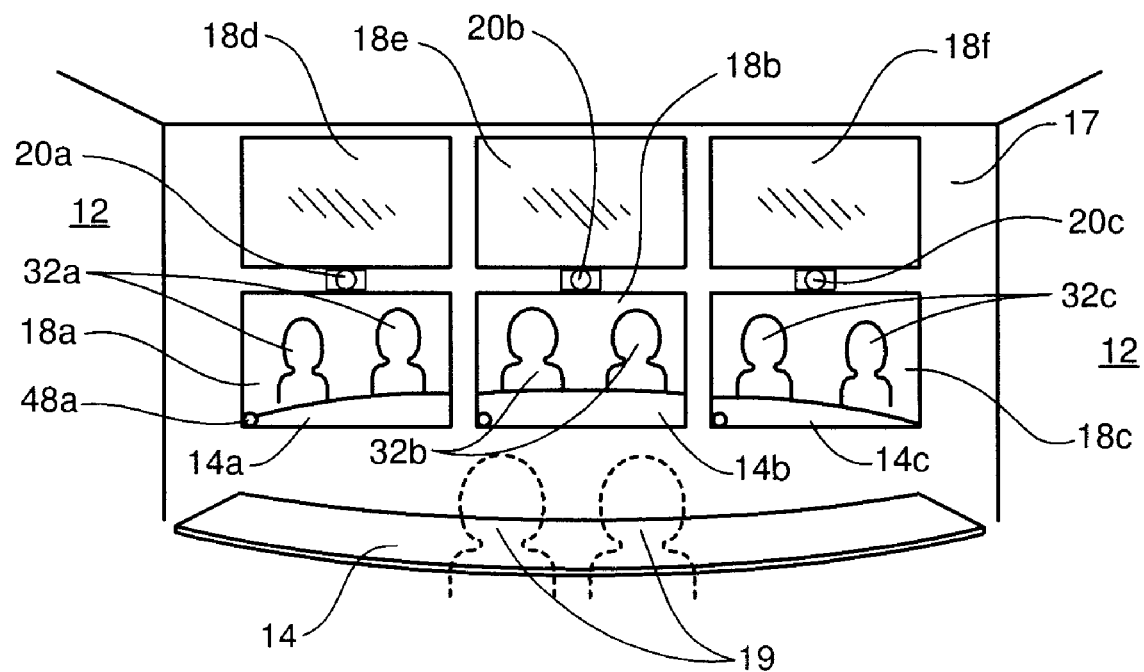
FIG. 2 is a perspective view looking toward the front of the video conference room of FIG. 1, showing the array of video displays and the conference table.
Figure 3:
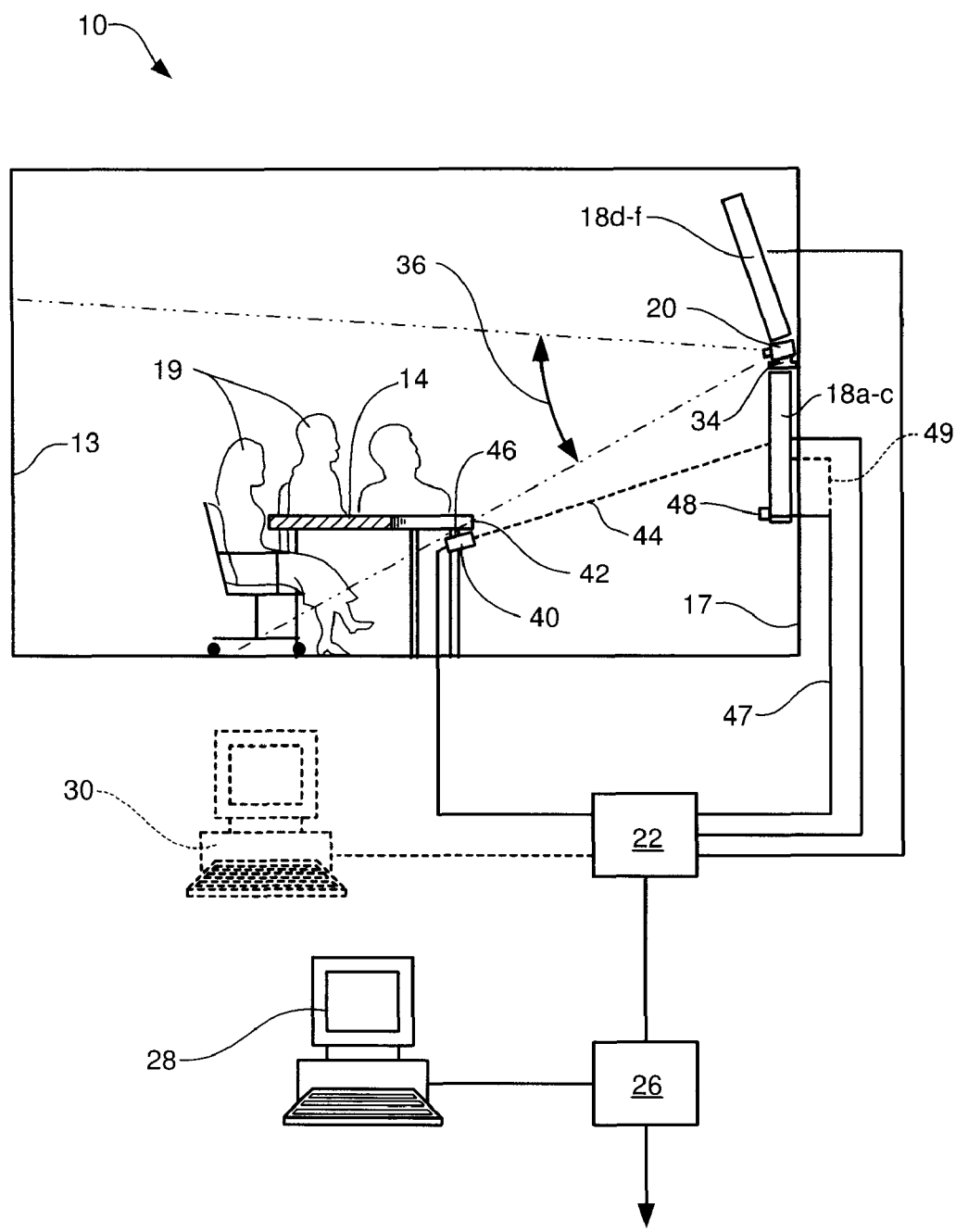
FIG. 3 is a cross-sectional or elevation view of one embodiment of a video conference room like that of FIG. 1 having an integrated display calibration system.

In the embodiments shown in FIGS. 1-3, the video conference studio 10 is a room bounded by side walls 12, a back wall 13, a front wall 17, and having a conference table 14 with a plurality of participant positions 16 (e.g. chairs, numbered 1-6 in FIG. 1) adjacent to the table, at which video conference participants (19 in FIG. 2) can sit. On the front wall 17 of the room, opposite the conference table, are a plurality of video conference displays 18 (e.g. flat panel or other video displays), with a video camera 20 positioned near each display. In FIG. 1 only three display positions are shown, labeled 18a-c. The view of FIG. 2 shows six displays arranged in vertical pairs, these displays being labeled 18a-f. While three cameras and three display positions are depicted in FIG. 1, and three cameras and six displays are shown in FIG. 2, it is to be understood that video conference systems generally and remote presence video conference systems in particular are not limited to these numbers. Such studios can have more or less than these numbers of cameras and displays. While the cameras are depicted in FIGS. 2 and 3 as being positioned between the respective pairs of monitors or displays, they can be in other locations around the studio, such as above the displays, located above a different part of the display, or located separate from the display, etc.

The cameras 20 and displays 18 are interconnected to a control system 22, such as a computer network, which in turn is interconnected via a communications network (e.g. the Internet), represented by line 24, to one or more remote information systems 26. Video images taken from other video conference studios are transmitted via the computer network system and displayed upon the corresponding displays of the opposing room(s). For a video conference, the remote information system can be a similar video conference control system (not shown) associated with a remote video conference studio (not shown).

The remote information system 26 can also allow a remote user to control or adjust the video conference cameras 20, displays 18 and other components of the video conference room 10. The remote information system can be interconnected to a data entry device, such as a computer terminal 28, through which the video conference system can be controlled and monitored, and through which a user can enter and transmit data within the system. Similar data entry devices can be associated with other portions of the video conference system as well. For example, a data entry terminal 30 (shown in dashed lines in FIG. 1) can be associated with the local control system 22 to allow a user to control and monitor the video conference system.

It is to be understood that the terms "computer," "controller," "terminal" and "server" are intended to include any type of computing device, such as a personal computer, portable computer, workstation computer, server, embedded system, etc. The term "network" is intended to include networks of computing devices, such as a local area network (LAN), the Internet, etc. Computing devices frequently include a processing unit, system memory, and a system bus that couple the processing unit to various other components of the system. The processing unit can include one or more processors, each of which may be in the form of any one of various commercially available processors. Generally, each processor receives instructions and data from a read-only memory and/or a random access memory. The computing device can also have associated with it a hard drive, a floppy drive, CD ROM, or other data access device that is connected to the system bus by respective interfaces. The hard drive, floppy drive, and CD ROM drive can contain respective computer-readable media disks that provide non-volatile or persistent storage for data, data structures and computer-executable instructions. Other computer-readable storage devices (e.g., magnetic tape drives, flash memory devices, and digital versatile disks) can also be used with the system.

Viewing FIG. 2, the video conference studio can include three positions for displays 18, with two displays at each position, disposed one above the other. The lower displays, 18a-c, can be configured as video conference views, showing conference participants 32 in the other studios, while the upper displays 18d-f can be configured as reference displays, which can be used to show illustrations, diagrams, documents, and other reference materials to which the conference participants may refer. This allows participants to face each other to talk, and to view common reference materials provided on the reference displays during the conference without significantly averting their gaze.

Viewing FIG. 3, the video cameras 20 can each include a pan-tilt-roll (PTR) mechanism 34, which allows the orientation and alignment of each camera to be adjusted. Each camera has a field of view 36 that depends on the orientation of the camera (pan, tilt and roll) and the zoom and focus setting of the camera itself. This field of view 36 has a vertical scope or range, as shown in FIG. 3, and a horizontal scope or range, which is depicted in FIG. 1. Adjustment of the camera alignment, along with adjustment of the zoom and focus controls of the camera, allows each camera to provide different views, which can be desirable in different circumstances. Viewing FIG. 1, in a six position video conference studio, a common camera orientation can have each of three cameras 20 oriented substantially straight ahead (the respective horizontal camera view ranges being designated by dashed lines labeled 36a-c), taking an image of the two participant positions 16 that are directly opposite the associated display 18.

With a video conference studio configured in this way, various views can be provided, one example of which is illustrated in FIG. 2. In a four-way video conference (i.e. four video conference rooms interconnected in a roundtable fashion) using four video conference rooms configured like that of FIG. 1, the field of view of each of the three cameras 20 can be adjusted to view the same group of two participants in a given room, though from different vantage points. That is, referring to FIG. 1, all cameras 20a-c can be adjusted to view participant positions 3 and 4 in each room. Each different view of the participants is provided to only one of the other three video conference studios, so that each studio receives a unique combination of right, left and center views of other participants, to give the appearance for all participants of a face-to-face, round table type conference.

Thus, each video conference studio receives straight-on and right and left side angle views, respectively, of the participants in the other conference rooms, corresponding to their display positions. This provides an appearance like that shown in FIG. 2, wherein the center display 18b shows the center two participants 32b from one of the other rooms from straight on. The center display in that other room will likewise show the straight on view of the participants in the room 12. The left hand display 18a shows the two participants 32a from one of the other rooms from a left side view. For a roundtable arrangement, the view from the right side camera 20c will be transmitted to the studio from which the view on the left hand display comes. Finally, the right hand display 18c shows the center two participants 32c from the last room from a right side vantage point, and the view from the left side camera 20a will be transmitted back to that studio. The relative angle and curvature of the visible portion of the conference tables 14a-c from each room suggests the different vantage points. This configuration gives the feeling that the conference table 14 at which the local participants are seated continues around in a circle, with all participants seated at the same round conference table.

It is to be appreciated that the views and images shown herein are exemplary only, and that a wide variety of other fields of view and corresponding images can be provided. Likewise, certain camera orientations and corresponding views may be more desirable or common than others, both among those shown herein and others not shown.

As noted above, one potentially time-consuming and expensive process that can be associated with remote presence video conference systems is the alignment and calibration of the video cameras 20. Indeed, while video conference studios are illustrated and discussed herein, this issue is relevant to video display systems in other types of environments, and is not limited to video conference studios. In a display system such as a video conference environment having only one display, the calibration status of the video display is not always noticeable. However, with a multiple display system, the experience is improved when all of the displays are calibrated to a common standard. Where multiple displays are present in a single video conference studio, for example, it is generally desirable that each display be calibrated to the same color output, so that skin tones, backgrounds, and other elements of the displayed images have consistent coloring and appearance from one display to another. Consistent brightness and contrast are also desirable. In a video conference room like that of FIG. 2, for example, where opposing conference rooms are configured to look identical, the experience can be diminished if the three displays 18 do not provide consistent coloring, making the rooms in the three displays appear different from each other. Common color tones, brightness, contrast etc. are desirable to give the look and feel of an in-person video conference.

Calibration of the displays in a video conference room can be done in various ways. Some calibration approaches involve a qualified technician travelling to the video conference studio to connect specialized equipment to the displays, and using calibration software to analyze the output of the displays, before adjusting them. This approach can be expensive and time consuming. Advantageously, the inventor has developed a system and method for remote calibration of video conference views that allows a person to calibrate the displays in a video conference room by an entirely remote process. This system and method removes the person from being in the studio and having to take special equipment to the studio to perform the calibration. Also, when a studio goes out of calibration, this display calibration system can be used to bring it back to calibration remotely.

The system and method disclosed herein provides integrated sensors in a specialized video conference room, so that displays can be calibrated remotely. By enabling remote calibration, the video conference displays can be initially calibrated, then monitored and corrected during use as drifts in the system occur. One embodiment of a video conference room having an integrated display calibration system is shown in FIGS. 1 and 3.

Shown in FIG. 3 is a side view of a specialized conference room 12 with one possible location for such a sensor. In this embodiment a display sensor 40 is positioned below the front edge 42 of the conference table 14 in a position where the sensor has a clear view of the displays 18 along view path 44. The sensor is connected to the computer or server system 22 that controls the displays, and provides feedback that indicates the display parameters (e.g. color, contrast, brightness, etc.). The display sensor can be a single sensor for the entire room and mounted on a pan/tilt mechanism 46, allowing one sensor to obtain display information regarding multiple displays. Other mechanisms can also be used for allowing one sensor to view multiple displays. For example, an electronically steerable sensor array or other fixed or semi-fixed system with a variable view direction can be used. Viewing FIG. 1, this sort of arrangement can allow one sensor 40b located in the center of the room to pan and view all three display positions 18a-c. Additionally, a single sensor can be used to view both upper and lower display positions, so that one sensor can view one or all of the lower video conference displays (18a-c in FIG. 2) and one or all of the upper reference displays (18d-f in FIG. 2, 3).

Alternatively, the sensor system can include multiple sensors 40, such as sensors 40a-c, shown in FIG. 1. This type of arrangement can provide one sensor per display if desired. Having one sensor per display can be desirable in terms of cost and reliability. That is, the cost of a pan/tilt mechanism 46 or other system for varying the sensor view direction may exceed the cost of two or more additional sensors, depending upon the number of displays in a given room. Additionally, a mechanical pan tilt device may be less reliable and require more maintenance than a solid state color sensor device. Additionally, where displays are provided in an upper and lower display configuration, as shown in FIGS. 2 and 3, one sensor can be provided for both the upper and lower displays in each pair, or a separate sensor can be provided for each of the upper and lower displays, respectively.

There are a variety of sensors that can be integrated into a video conference studio in accordance with this system and method. For economical reasons, it can be desirable to use low cost color sensors that are now available. For example, one relatively low cost tri-stimulus colorimeter that can be used is the CL-200 Chroma Meter that is available from Konika Minolta. A tri-stimulus meter measures the three colors (X, Y, and Z) that approximate what the human eye is sensitive to. Low cost photospectrometers can also be used, such as the i1Design LT available from X-Rite. A photospectrometer measures the spectrum power distribution emitted or reflected from an object. The sensor 40 can have a small lens on it so that it is focused on one small area of the display 18 that is being calibrated. Calibration software can determine the exact location of the display on which the sensor is to be focused, so that calibration can be targeted there.

Figure 4:
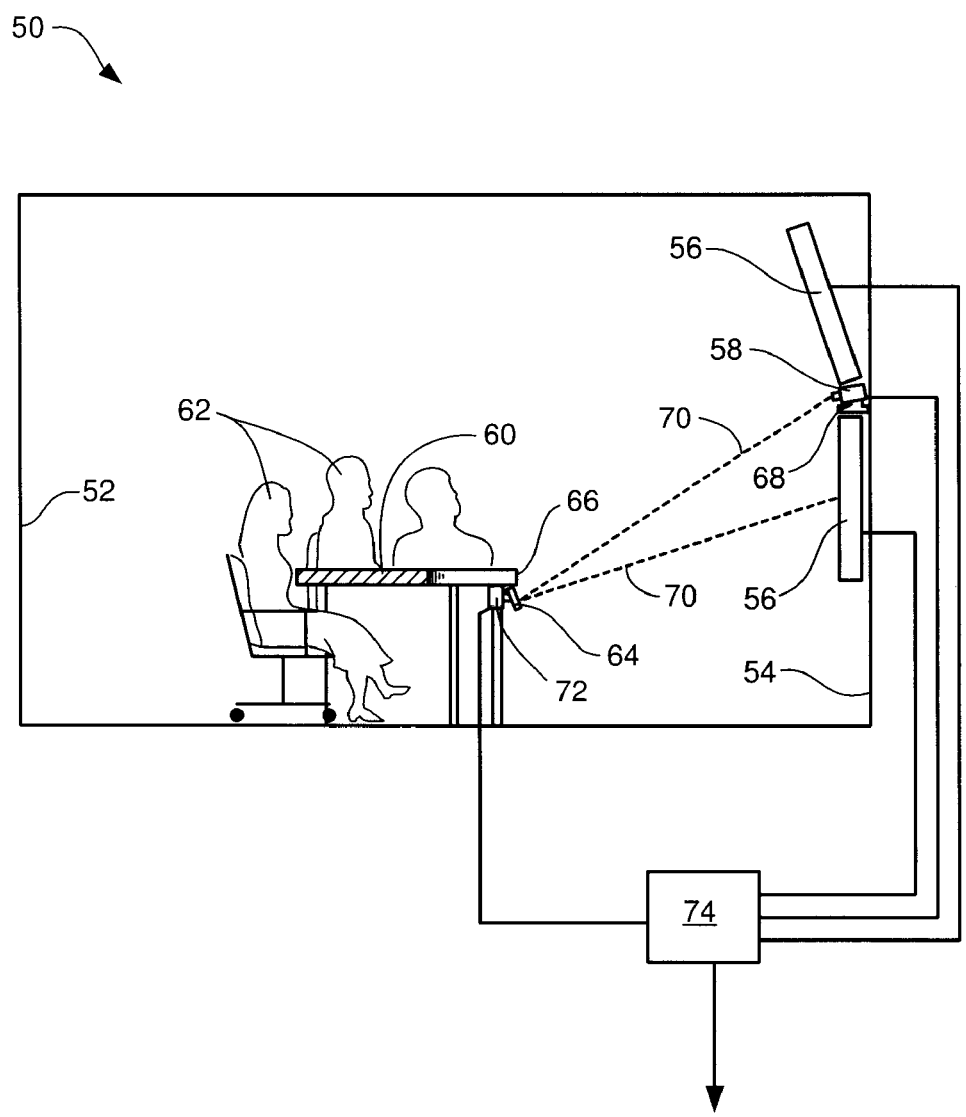
FIG. 4 is a cross-sectional or elevation view of one embodiment of a video conference room like that of FIG. 1 having an integrated display calibration system using a mirror reflection system.

As one alternative, the sensor can be a CCD or CMOS device. Such a sensor can be placed in the sensor position indicated in FIG. 3, and focused toward the desired display 18. Alternatively, since CCD and CMOS devices are commonly used in cameras, the camera that is used to image the room can also be used as a display calibration sensor. One embodiment of such a system is shown in FIG. 4. As with embodiments shown and discussed above, this video conference room 50 includes a back wall 52, and a front wall 54, to which displays 56 and a camera 58 are attached. A conference table 60 is positioned in the room with locations for conference participants 62 to sit to view the displays.

The video conference room 50 also includes a mirror 64 that is attached below the front edge 66 of the conference table 60. The camera 58 includes a pan/tilt mechanism 68 or other mechanism that allows the orientation of the camera to be adjusted toward the mirror. The mirror is oriented so that the camera can capture a reflected image of the display along a reflected line of sight 70. The mirror can also be attached to a pant/tilt mechanism 72 or other mechanism for reorienting the reflected line of sight, so that the mirror can reflect images from multiple displays to the camera. The image(s) captured by the camera can then be analyzed by the controller 74 or some other local or remote computing device, to provide the desired calibration feedback in the manner outlined below.

Another sensor configuration that can be used is illustrated in FIGS. 2 and 3. As an alternative to (or in addition to) sensors associated with the conference table 14 or in other parts of the room, sensors can also be physically connected to or associated with the displays. A sensor 48 that is attached to at least one of the displays 18 is shown in FIGS. 2 and 3. As shown in FIG. 2, the sensor 48 can be attached to each of the lower displays 18a-c in a region of the display that will not significantly block the view. The size and shape of the sensor depicted in the figures is for illustrative purposes only, and is not intended to represent the actual size or shape of such a sensor. A side view of such a sensor connection is shown in FIG. 3. This type of sensor can be attached to any number of displays and in various ways.

The display-attached sensor 48 can be a type of sensor that includes suitable optical elements and a diffusive surface, so that it can be directly attached to the display and obtain useful display information. Such sensors are commercially available. The output from such a sensor can be provided to the controller 22 via communication line 47, or it can be provided as direct feedback to the display, as indicated by communication line 49.

To calibrate the system, a set of test patterns can be put up on a display and captured by the associated sensor(s) or camera(s). Readings from the sensors can then be analyzed for color, brightness, contrast, etc., and the displays can then be adjusted to have the correct settings for those parameters. For some colors, such as black, it is considered desirable to have the lights in the room turned on so that ambient flare is accounted for in the display calibration. With other colors, such as white point, it is considered desirable to have the lights turned off in case an anomolous reflected color is captured in the display.

Figure 5:
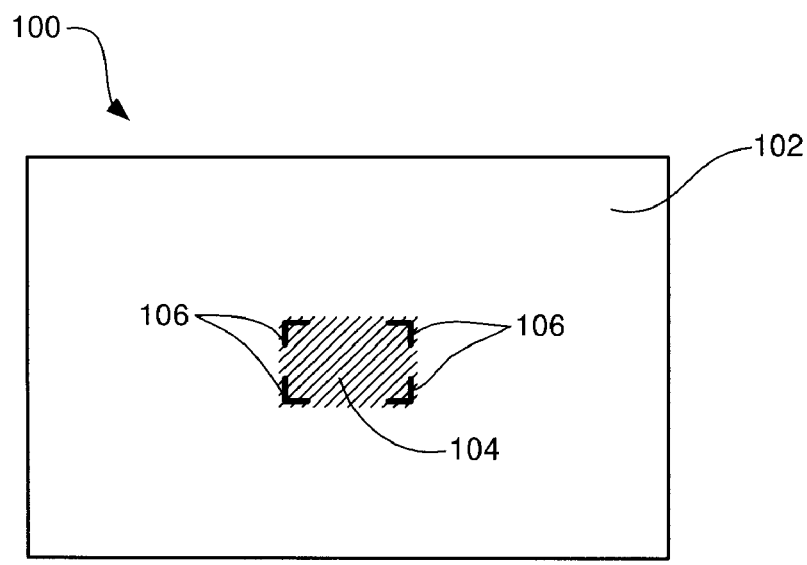
FIG. 5 depicts a display screen having one embodiment of a display calibration pattern.

The color pattern that is used for display calibration can take a variety of forms. Shown in FIG. 5 is one embodiment of a display calibration pattern 100 on a display screen. This display calibration pattern includes a substantially solid field 102 of one color, such as the color of the back wall 13 of the room, which would normally dominate the display field, with one patch or area 104 of a contrasting color of interest located within the display. Having the majority of the display illuminated with some color causes the display to have an electrical load similar to normal operation. A CRT or plasma display can change in overall intensity as a function of electrical load due to limits in the power circuitry. Consequently it is desirable to have such a load when calibrating the display in order to improve the accuracy of the calibration. The color sensor can be focused on this small patch of color, as represented by the camera view outline points 106. The display system can scroll through many colors in the color patch 104, allowing the sensor to take an image of each, determine the correspondence of the colors to standard colors, and then provide command signals to the display to adjust color output for specific colors if needed.

The series of colors that can be displayed for sensing and calibration can vary. In one embodiment, the system can scroll through the basic display colors of red, green, blue, white and black. This sort of approach can be used where the display is a CRT type display that produces all colors as a combination of red, green and blue primary colors. The system can also display other basic colors for sensing, such as cyan, magenta, yellow and grey. The system can also display other colors, such as colors of specific objects in the room, such as the color of the back wall (13 in FIG. 3), or other colors of interest, such as skin tones. Whatever colors are displayed, a specific response is expected from the sensor for each color. When the expected response is not received by the controller 22, that indicates that an adjustment of the display is indicated.

Figure 6:
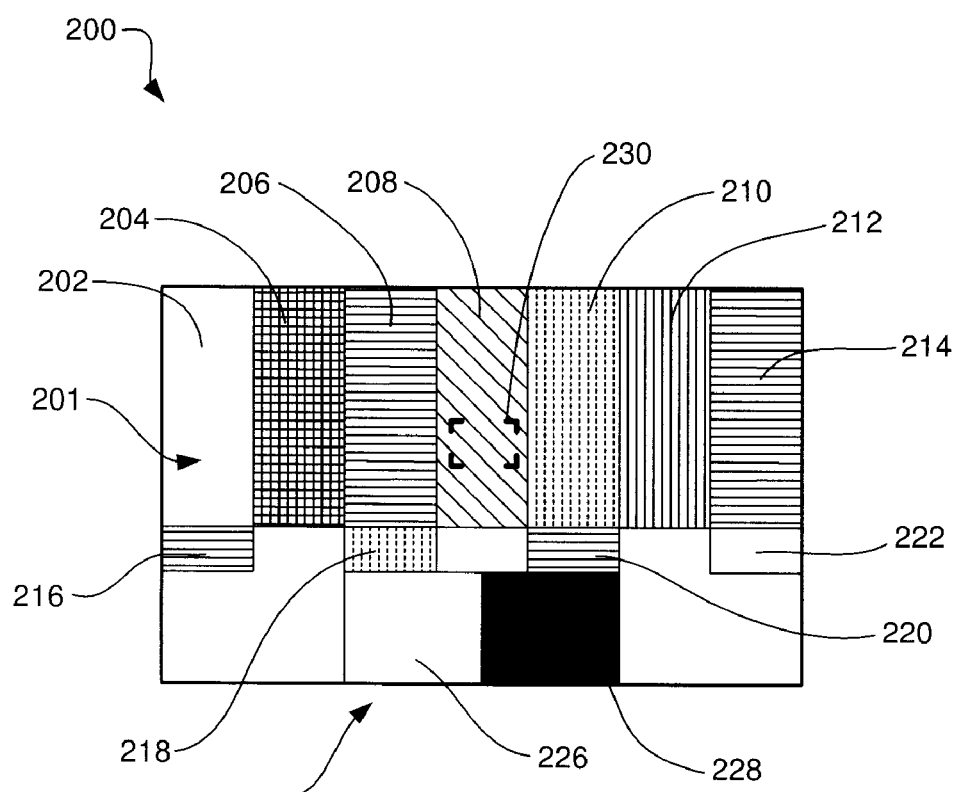
FIG. 6 depicts a screen having a display calibration pattern based upon the SMPTE test pattern.

Another display calibration pattern that can be used is the SMPTE test pattern 200, shown in FIG. 6. The SMPTE color bars are a type of television test pattern, adopted by the Society of Motion Picture and Television Engineers (SMPTE). The components of this pattern are a known standard, so comparing this pattern as received to that known standard gives video engineers an indication of how a video signal has been altered by a display, and thus what adjustment is needed to bring the display back to original condition. This pattern can also be used for setting chrominance and luminance settings. Versions of the SMPTE color pattern have been developed to test both 4×3 standard definition and 16×9 high-definition video signals.

In an SMPTE color bar image 200, like that shown in FIG. 6, the top two-thirds of the image contains a main set of color bars 201, which includes seven vertical bars of 75% intensity. In order from left to right, these bars are white 202, yellow 204, cyan 206, green 208, magenta 210, red 212, and blue 214. This sequence runs through all seven possible combinations that use at least one of the three basic color components of green, red, and blue that are used in a CRT type display, with blue cycling on and off between every bar, red cycling on and off every two bars, and green on for the leftmost four bars and off for the rightmost three. Because green contributes the largest share of luminance, followed by red, then blue, this sequence of bars thus appears on a waveform monitor in luminance mode as a downward staircase from left to right.

Below the main set of seven bars is a strip of blue, magenta, cyan, and white castellations 216, 218, 220 and 222. When a video display is set to filter out all colors except for blue, these castellations, combined with the main set 201 of color bars, are used to properly adjust the color controls. In such a setting the four castellations will appear as four solid blue bars, with no visible distinction between the bars and the castellations if the color controls are properly adjusted.

The bottom section 224 of the test pattern contains a square 226 of saturated (100% intensity) white and a rectangle 228 of saturated (7.5% intensity) black, for use in setting the luminance range. Although the SMPTE test pattern was designed to calibrate analogue television equipment, it remains widely used within modern digital television facilities. In addition to CRT type video displays, this test pattern can be used to calibrate LCD, plasma and other types of displays. Those of skill in the art will be aware that other features for display calibration can also be included in this test pattern, and that other test patterns can also be used.

Regardless of which test pattern is used, the process for calibrating the video displays is generally consistent. In general, the integrated sensors in the video conference studio or other video display location are first focused on the test pattern, and the associated control system then analyzes the output signals and adjusts the display to provide a uniform or standard display appearance. The steps involved in one embodiment of a method for color calibration of a video display in accordance with the present disclosure are outlined in the flowchart of FIG. 7. The first step is to display the test pattern on the video display (step 300). The next step is to detect the colors on the display (step 302). This step can be viewed to incorporate several sub steps, depending upon the particular embodiment of the display calibration system that is used. For example, if the system does not include one sensor per display, the step of detecting the colors can involve first aiming the sensor at a particular display, such as by adjusting a pan tilt mechanism associated with a sensor (40 in FIGS. 1, 3) or a camera and mirror (58 and 64 in FIG. 4). Detecting the colors can further include focusing the sensor or camera upon the test pattern image or a portion of it. For example, the sensor can be focused on a small focus area 106 of a single changing color patch 104, as shown in FIG. 5. Alternatively, the sensor can be focused on a small focus area 230 that sequentially moves to different color portions of a test pattern 201 like that shown in FIG. 6.

Referring again to FIG. 7, once a color has been detected, the system then analyzes the color (step 304) to determine its compliance with predetermined color standards for the display. If the color does not match the color standard (e.g. within some preset range of tolerance) as determined at step 306, the system adjusts the display color output (step 308) and returns to step 302 to obtain feedback regarding the efficacy of the adjustment. These steps can be repeated until the color that is being considered does comply with the display standard.

If the detected color does match the color standard as determined at step 306, the system next considers whether there are more colors (step 310). If there are more colors to consider, the system can return to step 300 or step 302. That is, if the test pattern is a single color test pattern, like that shown in FIG. 5, the system will change the test pattern (step 300) to a different color before proceeding to detect color again. However, if the test pattern is a multiple color test pattern, like that shown in FIG. 6, the system can simply return to the same test pattern and view a different color bar in that test pattern in step 302. Alternatively, where a fixed pattern is used such as SMPTE bars, either the sensor focus can be moved (using a pan/tilt or similar mechanism) or the test pattern itself can be moved on the display. This latter approach can be desirable because it does not require a mechanism for reorienting the sensor, yet still allows the use of a standard pattern. The pattern can be moved using standard video adjustment controls built into a display, the pattern generator, or other devices in the video pipeline. The process continues as before until the particular color of interest is properly calibrated. Upon returning to step 310, if there are no more colors to consider, the process ends (step 312).

Figure 7:
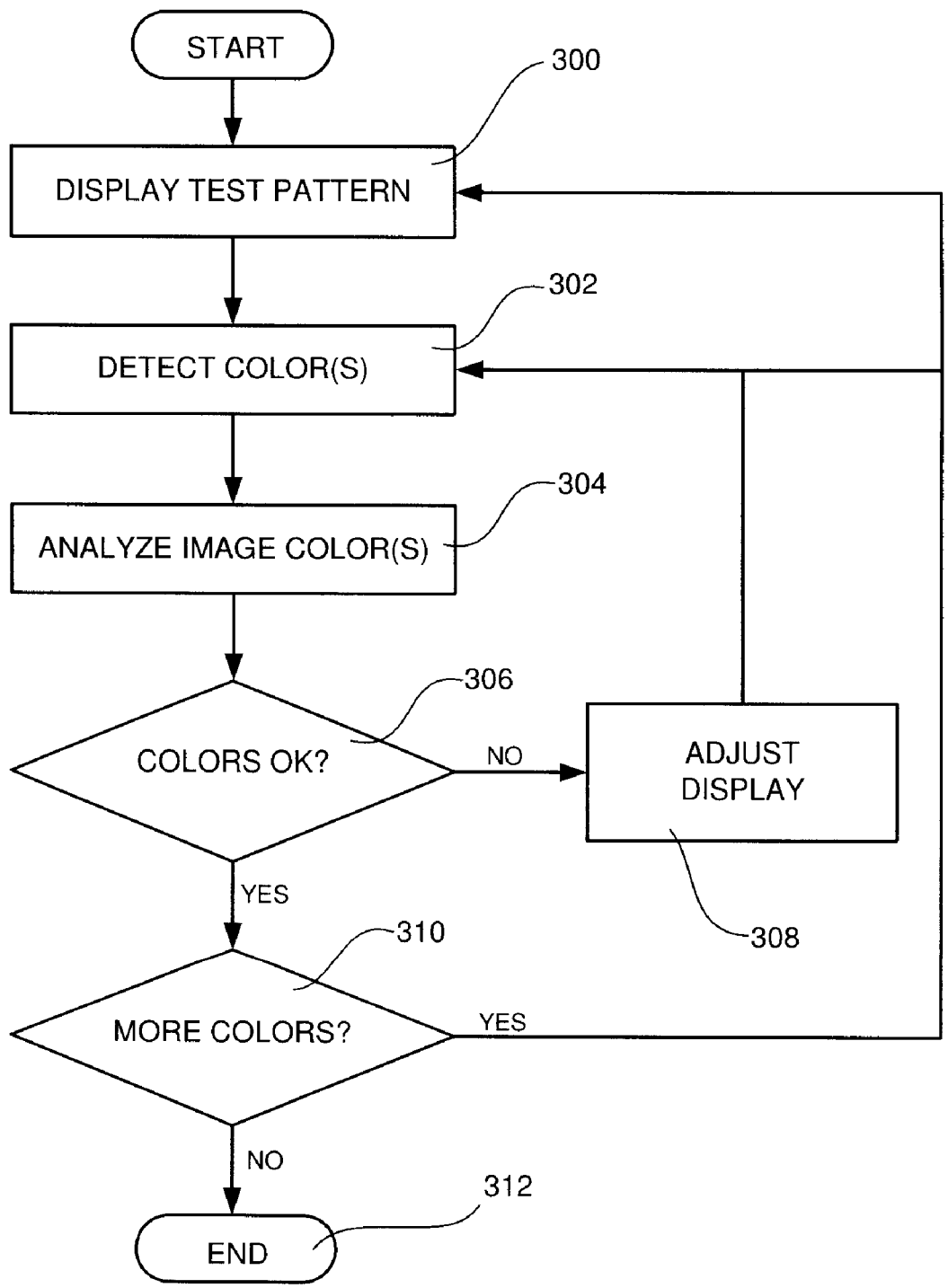
FIG. 7 is a flowchart outlining the steps involved in one method of display calibration in accordance with the present disclosure.

While the steps outlined in FIG. 7 are presented in terms of color calibration, the integrated display calibration sensor system disclosed herein can also be used for calibrating display brightness and contrast. Brightness and contrast are really just calibration controls for black point and white point, respectively. Brightness is adjusted to set the black point of the display at a specific luminance. Likewise contrast is adjusted to set the white point or a mid gray point at a specific luminance. To adjust brightness or contrast, the process outlined in FIG. 7 is followed with black, white or gray as the color(s) of interest. Based upon signals from the sensors, the brightness of a display can be adjusted by adjusting the black point of that display, and contrast can be adjusted by changing the white point of the display.

It is to be noted that this system and method allows displays to be calibrated manually or automatically, both locally or remotely. For example, referring back to FIG. 3, the local controller 22 can be programmed to automatically calibrate the displays 18 in the manner described herein based upon input from the display sensors, or a user can manually calibrate the displays based upon sensor input via the local input terminal 30 or via controls associated with the displays 18 themselves. On the other hand, the remote system 26 can also be programmed to automatically calibrate the displays based upon sensor input, or a user can manually calibrate the displays via a remote input terminal 28. Automatic calibration of the displays can be desirable, such as by the local controller 22 automatically calibrating the displays during a non-use period (such as during the night time).

The system and method disclosed herein thus allows calibration of displays in an environment such as a video conference room. The system uses low cost color sensors aimed at a display in a video conference room to allow remote calibration of the displays. One feature of this system is that calibration can be performed without sending someone to the room. By enabling remote calibration, a system can be monitored and corrected as drifts in the system occur. The video conference studio can include a single sensor for the entire room, mounted on a pan/tilt mechanism (or some other view redirecting mechanism), or a collection of sensors can be provided, such as one per display. While the system and method has been described above in the context of a video conference studio, this system and method is useful for any video display environment, to allow remote calibration of the display characteristics.

It is to be understood that the above-referenced arrangements are illustrative of the application of the principles disclosed herein. It will be apparent to those of ordinary skill in the art that numerous modifications can be made without departing from the principles and concepts of this disclosure, as set forth in the claims.

What is claimed is:
1. A video display system, comprising:
a plurality of video displays, disposed in a video display environment;
a display sensor, oriented to view at least one of the video displays;
a display control system, controllable from outside the video display environment, interconnected with the video displays and the display sensor, configured to receive a signal from the display sensor, and to calibrate a display parameter of at least one of the video displays in response to the signal; and
a remotely controllable orientation shifting mechanism, associated with the display sensor, whereby the orientation of the sensor can be remotely adjusted to view more than one display in the video display environment.

2. A video display system in accordance with claim 1, wherein the display sensor comprises multiple sensors oriented to view the multiple video displays.

3. A video display system in accordance with claim 2, wherein a ratio of sensors to video displays is 1 to 1.

4. A video display system, comprising:
a video display, disposed in a video display environment;
a display sensor, oriented to view the video display; and
a display control system, controllable from outside the video display environment, interconnected with the video display and the display sensor, configured to receive a signal from the display sensor, and to calibrate a display parameter of the video display in response to the signal;
a video imaging device, oriented to take an image of the video display environment not including the video display, the display sensor being incorporated within the imaging device; and
a view redirection device, oriented to selectively provide a view of the video display to the imaging device.

5. A video display system in accordance with claim 4, further comprising a remotely controllable orientation shifting mechanism, associated with each of the video imaging device and the view redirection device, whereby the orientation of the video imaging device and the view redirection device can be remotely adjusted.

6. A video display system in accordance with claim 4, wherein the display sensor is selected from the group consisting of a tri-stimulus meter, a photospectrometer, a CCD device, and a CMOS device.

7. A video display system, comprising:
a video display, disposed in a video display environment;
a display sensor, oriented to view the video display; and
a display control system, controllable from outside the video display environment, interconnected with the video display and the display sensor, configured to receive a signal from the display sensor, and to calibrate a display parameter of the video display in response to the signal, wherein the display sensor is positioned below a front edge of a conference table in the video display environment.

8. A method for calibrating a video display, comprising:
affixing and orienting a sensor to face a particular display in a video display environment, wherein orienting the sensor to face the particular display comprises selectively physically reorienting the sensor to sequentially view the particular display from among multiple displays;
obtaining a signal from the sensor representing a parameter of an image on the particular display; and adjusting output parameters of the particular display based upon deviation of the signal from standard display parameters.

9. A method in accordance with claim 8, further comprising providing a test pattern of known characteristics on the particular display while the sensor is oriented toward the particular display.

10. A method in accordance with claim 8, wherein adjusting the output parameters of the particular display comprises adjusting at least two of color, brightness and contrast of the particular display.

11. A method for calibrating a video display, comprising:

affixing and orienting a sensor to face a display in a video display environment, wherein orienting the sensor to face the display comprises selectively physically reorienting a view redirecting device to provide a display image to a video imaging device oriented to take an image of the video display environment not including the display, the sensor being incorporated within the imaging device;

obtaining a signal from the sensor representing a parameter of the image on the display; and adjusting output parameters of the display based upon deviation of the signal from standard display parameters.

12. A non-transitory computer-readable storage medium storing machine readable program code, for causing a video display system having a processor to:

receive a signal from a sensor oriented to face a display in a video display environment, the signal representing a parameter of an image on the display;

adjust output parameters of the display based upon deviation of the signal from standard display parameters; and selectively physically reorient the sensor to sequentially view more than one display.

13. A non-transitory computer-readable storage medium in accordance with claim 12, further comprising program code for causing the display system to provide a test pattern of known characteristics on the display while the sensor is oriented toward the display.

14. A non-transitory computer-readable storage medium in accordance with claim 12, further comprising program code for causing the display system to adjust at least two display parameters selected from the group consisting of color, brightness and contrast of the display.

15. A non-transitory computer-readable storage medium storing machine readable program code for causing a video display system having a processor to:

receive a signal from a sensor oriented to face a display in a video display environment, the signal representing a parameter of an image on the display;

adjust output parameters of the display based upon deviation of the signal from standard display parameters; and selectively physically reorient a view redirecting device to provide a display image to a video imaging device oriented to take an image of the video display environment not including the display, the sensor being incorporated within the imaging device.

* * * * *